Patented Aug. 13, 1929.

1,724,248

UNITED STATES PATENT OFFICE.

ROGER ADAMS, OF URBANA, ILLINOIS, AND OTIS A. BARNES, OF COLORADO SPRINGS, COLORADO, ASSIGNORS TO ABBOTT LABORATORIES, OF NORTH CHICAGO, ILLINOIS, A CORPORATION OF ILLINOIS.

ANAESTHETIC COMPOUND.

No Drawing.   Application filed January 13, 1928.  Serial No. 246,653.

Our invention relates to substituted omega-piperidylalkyl esters of p-amino benzoic acid, having the general formula—

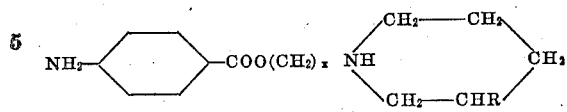

in which $x$ represents two or more, and R represents an organic radical.

These compounds may be prepared by the condensation of p-nitrobenzoyl chloride with a substituted piperidine, and reducing the p-nitrobenzoyl ester of the substituted piperidine to the corresponding p-aminobenzoyl ester.

*Example 1.—Beta (beta-carbomethoxypiperidyl) ethyl p-aminobenzoate hydrochloride.*

20 grams methyl nicotinate is reduced to methyl hexahydronicotinate by means of hydrogen and a platinum catalyst (Jour. Amer. Chem. Soc. 49, 1307, (1927)). To this product is added 40 grams of B-bromoethyl p-nitrobenzoate, the flask evacuated, and heated quickly in an oil bath at 105°–110° C. for one hour. The product is cooled and an excess of cold potassium hydroxide solution is added, and the condensation product taken up in ether. After drying the ether, dry hydrogen chloride is passed in, whereupon the hydrocloride of beta (beta-carbomethoxypiperidyl)—ethyl p-nitrobenzoate hydrocloride is formed. After recrystallization, it melts at 197–198° C.

The above nitro ester is reduced to the corresponding amino compound as follows: 20 grams are dissolved in 400 cc. of hot absolute alcohol, and, without cooling, the material is reduced by hydrogen, using 0.3 gram of platinum oxide as a catalyst. The alcohol is evaporated in vacuo, with the reaction product protected by hydrogen. The reduced product, which is the hydrochloride of beta (beta-carbomethoxypiperidyl) ethyl p-aminobenzoate, is recrystallized from absolute methyl alcohol, preferably guarding against oxidation by an inert gas. The product is a white solid melting at 186–188° C.

*Example 2.—Gamma—(beta-carbomethoxypiperidl)—propyl p-aminobenzoate hydrocloride.*

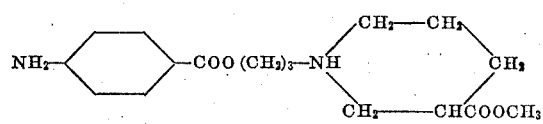

Methyl hexahydronicotinate is condensed with gammabromopropyl p-nitrobenzoate at 100–105° C., essentially as described in Example 1. Upon recrystallization of the hydrochloride from n-butyl alcohol, it melts at 207–208° C.

20 grams of the gamma—(beta-carbomethoxypiperidyl)—propyl p-nitrobenzoate hydrochloride obtained in the above manner is dissolved in 400 cc. of absolute ethyl alcohol, and reduced by means of hydrogen and a platinum catalyst, as described in Example 1. Upon recrystallization from absolute methyl alcohol, it was obtained as white crystals melting at 195°–196° C.

The described details of materials and process used being merely illustrative of preferred applications of our invention, it will be understood that the scope of the same must be determined by reference to the appended claims, said claims being construed as broadly as possible, consistent with the state of the art.

We claim as our invention:

1. As new products of manufacture, the substituted omega-piperidyl-alkyl esters of p-aminobenzoic acid, having the general formula

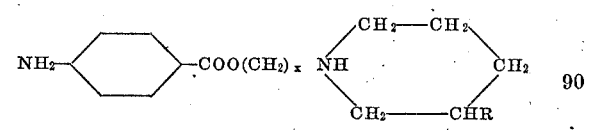

in which $x$ represents two or more, and R represents an organic radical.

2. As new products of manufacture, the substituted omega-piperidyl-alkyl esters of p-aminobenzoic acid, having the general formula

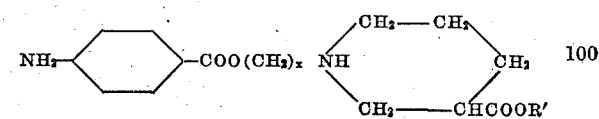

in which $x$ represents two or more, and R' represents an aliphatic hydrocarbon radical.

3. As new products of manufacture, the substituted omega-piperidyl-alkyl esters of p-aminobenzoic acid, having the formula

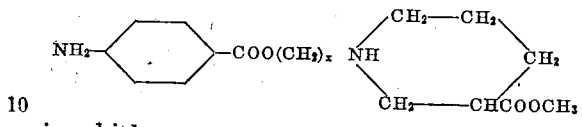

in which $x$ represents two or more.

4. As a new product of manufacture, gamma — (beta-carbomethoxypiperidyl) — propyl p-nitrobenzoate hydrochloride, having the formula

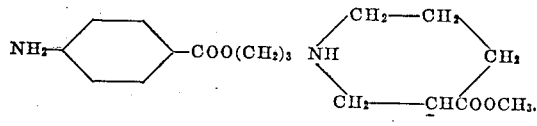

ROGER ADAMS.
OTIS A. BARNES.